United States Patent
Tseng et al.

(10) Patent No.: US 6,404,722 B1
(45) Date of Patent: Jun. 11, 2002

(54) METHOD OF INCREASING RECORDING DENSITY AND CAPACITY OF A COMPACT DISC

(75) Inventors: Tzu-Feng Tseng, Hsinchu Hsien; Wen-Rei Guo, Chiayi Hsien; Kuei-Yen Wu, Hsinchu, all of (TW)

(73) Assignee: Ritek Corporation, Hsinchu (TW)

( * ) Notice: Subject to any disclaimer, the term of this patent is extended or adjusted under 35 U.S.C. 154(b) by 81 days.

(21) Appl. No.: 09/706,262

(22) Filed: Nov. 3, 2000

(30) Foreign Application Priority Data

Aug. 1, 2000 (TW) ........................................ 89115462 A

(51) Int. Cl.$^7$ ................................................ G11B 7/00
(52) U.S. Cl. .............................. 369/112.01; 369/112.25
(58) Field of Search ................................ 369/44.23, 94, 369/112.01, 112.22, 112.23, 112.25, 112.26, 112.28, 126

(56) References Cited

U.S. PATENT DOCUMENTS 5,600,614 A * 2/1997 Katayama ................ 369/112.2
6,009,064 A * 12/1999 Hajjar ................... 369/112.24

* cited by examiner

Primary Examiner—Paul W. Huber
(74) Attorney, Agent, or Firm—J.C. Patents

(57) ABSTRACT

A method of increasing recording density and capacity of a compact disc. The compact disc has a transparent substrate and a data-recording region on the transparent substrate. To perform data access, a laser light beam emitting from a light source transmits through the transparent substrate and is incident on the data recording region. By inserting a optical plate with a super-resolution near-field structure between the light source and the compact disc, the light intensity of the laser light beam is increased and the aperture of the laser light beam is reduced. Therefore, the recording dimension of data recording region on the compact disc is reduced, and the recording density and capacity of the compact disc is increased. The super-resolution near-field structure is formed of a first dielectric layer, a second dielectric layer and an active layer sandwiched between the first and second dielectric layers. The material of the active layer is selected from one of gallium, germanium, arsenic, selenium, indium, antimony (stibium), tellurium and silver or gallium oxide, germanium oxide, arsenic oxide, selenium oxide, indium oxide, antimony oxide, tellurium oxide and silver oxide.

10 Claims, 4 Drawing Sheets

METHOD OF INCREASING RECORDING DENSITY AND CAPACITY OF A COMPACT DISC

CROSS-REFERENCE TO RELATED APPLICATION

This application claims the priority benefit of Taiwan application serial no. 89115462, filed Aug. 1, 2000.

BACKGROUND OF THE INVENTION

1. Field of the Invention

The invention relates in general to a method of increasing the recording density and capacity of a compact disc. More particularly, this invention relates to a method that increases the recording density and capacity of a compact disc by reducing the dimensions of the mark size on the data recording region from an incident laser light beam.

2. Description of the Related Art

As multimedia technology becomes more common and popular in application, data contains increasingly larger amounts of text, sound and image information. Therefore, development in this area has focused on the enhancement of recording density and access speed. Since a compact disc has the advantages of high recording density, compact volume, long storage term, low cost, high compatibility and low failure rate, it has been the major recording medium for portable optical data storage.

FIG. 1 shows a cross sectional view of a conventional rewritable compact disc 10. The compact disc 10 comprises a transparent substrate 12, and a lower dielectric layer 14, a recording layer 16, an upper dielectric layer 18, a reflecting layer 20, and a protection layer 22 formed sequentially on the transparent substrate 12. The recording layer is made of an alloy material including tellurium (Te), germanium (Ge), and antimony (stibium, Sb) or an alloy material including indium (In), silver (Ag), tellurium (Te), germanium and antimony. The upper and lower dielectric layers 18 and 14 are used to control the thermal conductivity of the recording layer 16. The upper and lower dielectric layers 18 and 14 thus include materials such as silicon nitride, silicon oxide, zinc sulfide-silicon dioxide, titanium oxide or carbide. The compact disc is shone with a laser light beam 26 from a light source 24. The laser light beam 26 transmits through the transparent substrate 12 to reach the recording layer 18, so as to recording data into or reading data from the recording layer 18.

The recording density is determined by the dimension of the mark size on the compact disc. Specifically, the laser light beam, emitted from the light source to form the minimum mark size on the compact disc, is restricted to the diffraction limit of the laser light beam. In addition, the relationship between the diffraction limit, the wavelength ($\square$) of the laser light beam, and the numeric aperture (NA) of the objective lens is 0.6 $\lambda$/NA. Thus, the current method to improve recording density of the compact disc is to reduce the wavelength of the laser light beam and to increase the numeric aperture of the objective lens. However, the current laser technique does not provide a narrower wavelength. Additionally, the fabrication cost for an objective lens with a larger numeric aperture is so great that fabricating such an objective lens is cost-prohibitive.

SUMMARY OF THE INVENTION

The invention provides a method of increasing the recording density and capacity of a compact disc. A compact disc is provided. The compact disc comprises a transparent substrate and a recording region on the transparent substrate. A laser light beam emitted from a light source incident on the compact disc is transmitted through the transparent substrate to reach the recording layer. The data access is then performed. Between the light source and the compact disc, an optical plate comprising a super-resolution near-field structure is inserted. The super-resolution near-field structure comprises a first dielectric layer, a second dielectric layer and an active layer sandwiched between the first and the second dielectric layers. The active layer is made of a material including gallium, germanium, arsenic, selenium, indium, tin, antimony, tellurium, and silver, or a material including gallium oxide, germanium oxide, arsenic oxide, selenium oxide, indium oxide, tin oxide, antimony oxide, tellurium oxide, and silver oxide. Transmitting through such super-resolution near-field structure, the light intensity of the laser light beam is increased and the aperture of the laser light beam is reduced.

The invention provides a super-resolution near-field structure between the light source and the compact disc to reduce the aperture of the laser light beam, so as to increase the recording density and capacity. When the laser light beam is emitted from the light source to record or read data, as the super-resolution near-field structure can increase the light intensity and reduce the aperture of the laser light. The diffraction limit of the laser light beam is thus overcome, and the recording dimension of the data recording region is reduced to increase the recording density and capacity.

Both the foregoing general description and the following detailed description are exemplary and explanatory only and are not restrictive of the invention, as claimed.

DESCRIPTION OF THE PREFERRED EMBODIMENTS

Figure 1:
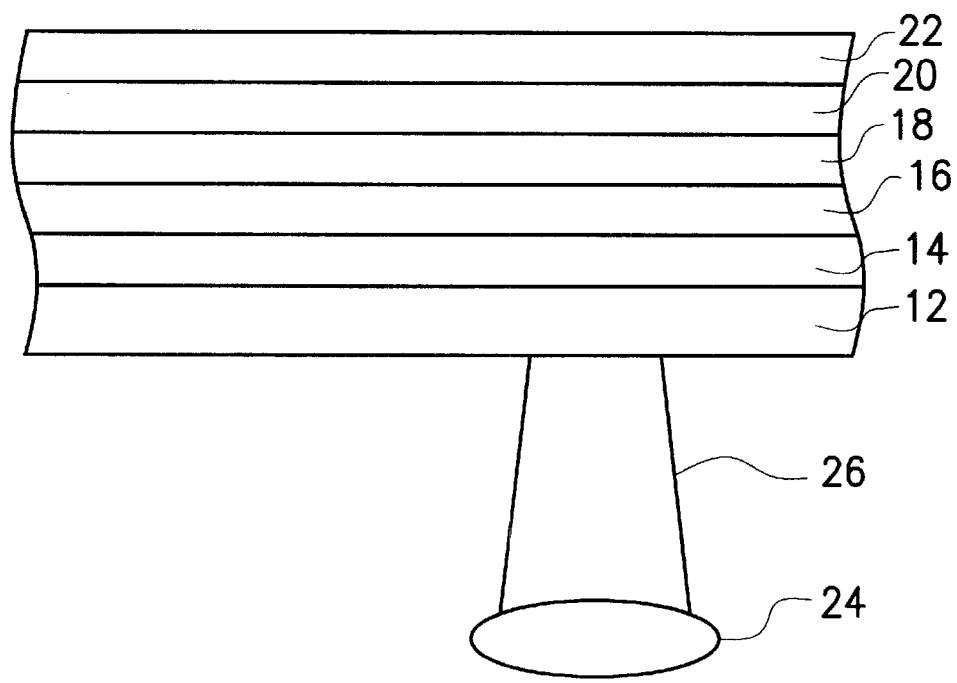
FIG. 1 shows a conventional rewritable compact disc.
Figure 2:
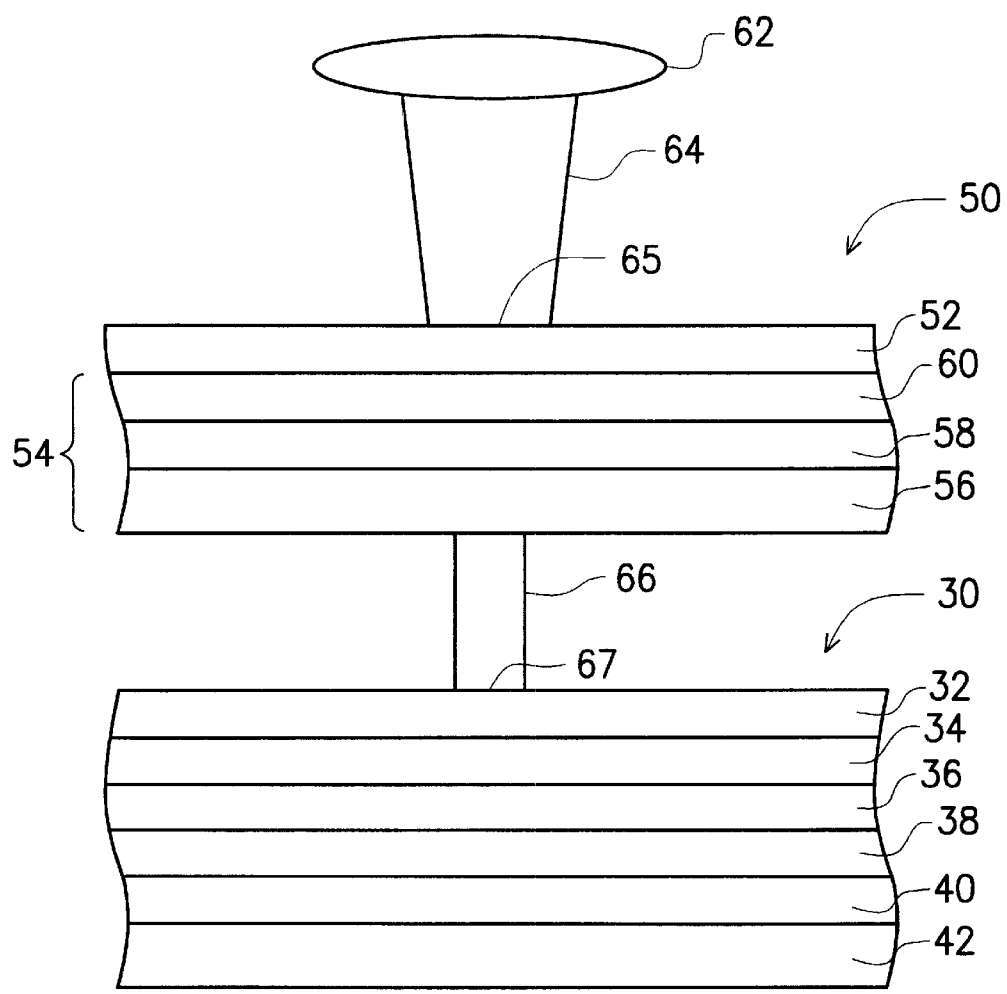
FIG. 2 shows a rewritable compact disc according to the invention.

In FIG. 2, a rewritable compact disc 30 is illustrated. The compact disc 30 comprises a transparent substrate 32, a dielectric layer 34 on the transparent substrate 32, a recording layer 36 on the dielectric layer 34, a dielectric layer 38 on the recording layer 36, a reflecting layer 40 on the dielectric layer 38 and a protection layer 42 on the reflecting layer 40. The recording layer 36 is made of a phase transition material comprising the alloy of tellurium, germanium, antimony or the alloy of indium, silver, tellurium, germanium, antimony. The dielectric layers 34 and 36 are formed to control the thermal conductivity of the recording layer 36. The dielectric layers 34 and 36 are typically made of silicon nitride, silicon oxide, zinc sulfide-silicon dioxide, titanium oxide or carbide.

In the invention, an optical plate 50 is inserted between the compact disc 30 and the light source 62 to result in a reduced aperture of a laser light beam emitted from the light source 62. The laser light beam 64 emitted from the light source 62 transmitting through a set of optical lenses (not shown in the figure) and the optical plate 50 to be incident on the recording layer 36 of the compact disc 30. The data are thus recorded into or read from the recording layer 36. The wavelength of the laser light beam 64 is about 635 nanometers or about 650 nanometer. The optical plate 50 comprises a super-resolution near-field structure 54 located over the transparent substrate 52. Or alternatively, the super-resolution near-field structure 54 can be disposed on a surface of an optical lens that is closest to the compact disc 30. Whichever arrangement is selected, the distance between the super-resolution near-field structure 54 and a surface of the compact disc 30 has to be smaller than the wavelength of the laser light beam 64.

The super-resolution near-field structure 54 comprises a dielectric layer 56 having a thickness of about 20 nanometer, an active layer 58 with a thickness of about 15 nanometer, and a dielectric layer 60 with a thickness of about 170 nanometer. The active layer 58 is made of a material selected from gallium, germanium, arsenic, selenium, indium, tin, antimony, tellurium, and silver. The dielectric layers 56 and 60 are then made of materials including silicon nitride, gallium nitride, aluminum nitride or titanium nitride. The active layer 58 can also be made of oxide of gallium, germanium, arsenic, selenium, indium, tin, antimony, tellurium, and silver, while the dielectric layers 56 and 60 are made of zinc sulfide, silicon oxide, aluminum oxide and titanium oxide.

Figure 3:
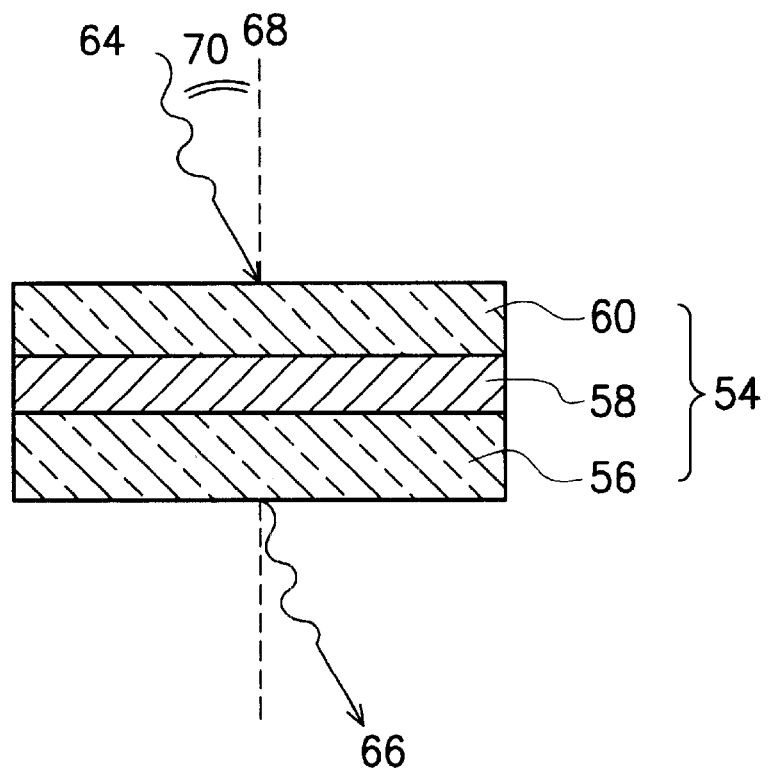
FIG. 3 shows a cross sectional view when a light beam transmits through the super-resolution near-field structure.

In FIG. 3, a cross sectional view for the light beam 64 to transmit through the super-resolution near-field structure 54 is shown. When the light beam 64 is incident from the dielectric layer 60, transmitting through the active layer 58, and projecting from dielectric layer 56 with the light beam 66, the transmittance of the light beam 64 and light intensity distribution of the light beam 66 depend on the refractive index and thickness of these three layers, and the incident angle 70 between the light beam 64 and the normal line 68. Generally speaking, when a light travels through a multi-layer structure of metal layers or dielectric layers, the light intensity is reduced. However, if the light travels through a special multi-layer structure, the light intensity is increased. For example, when the light traveling through the multi-level structure has an incident angle larger than the critical angle, total reflection is results. If the multilayer structure has the requisite arrangement and thickness to cause resonance, a higher output of light intensity can be obtained. Theoretically, when the absorption is negligible, a gain in intensity of several hundred percent can be obtained.

Figure 4:
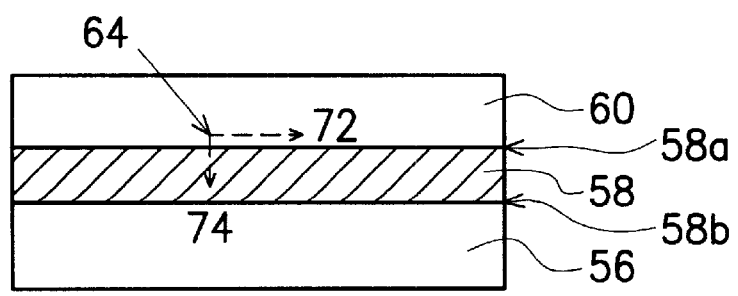
FIG. 4 shows a diagram of light intensity distribution when a light incident on a metal layer.

In FIG. 4, the light beam 64 is incident on a surface 58a of the active layer 58 (which is a metal layer in this example). The incident light beam 64 can be partitioned into a vertical component 74 and a horizontal component 72. When the magnitude of the horizontal component 72 is equal to the momentum of free electrons on the surface 58a, these free electrons can absorb the electromagnetic wave of the incident light beam 64. A periodic distribution is thus formed. The material wave of the density distribution of the electrons is a longitudinal wave. So that radiation electromagnetic wave is not generated along the surface 58a, however, the electric field along the vertical direction is attenuated exponential with the distance to the surface 58a. On the other hand, the vertical component 74 keeps propagating in the metal layer 58. When the magnitude of the vertical component 74 reaches the condition of having a resonant standing wave within the multi-layer structure, that is, when the thickness of the metal layer is a integer multiple of a half wavelength to cause the resonance, electromagnetic field is induced at the other surface 58b of the metal layer 58. Furthermore, since the metal layer 58 has a refractive index larger than those of the dielectric layers 56 and 60, the light beam is reflected within the metal layer 58 (normally in a form of total reflection since the refractive index of the metal layer is very large). A constructive interference is established to increase the light intensity on the surface 58b.

Figure 5:
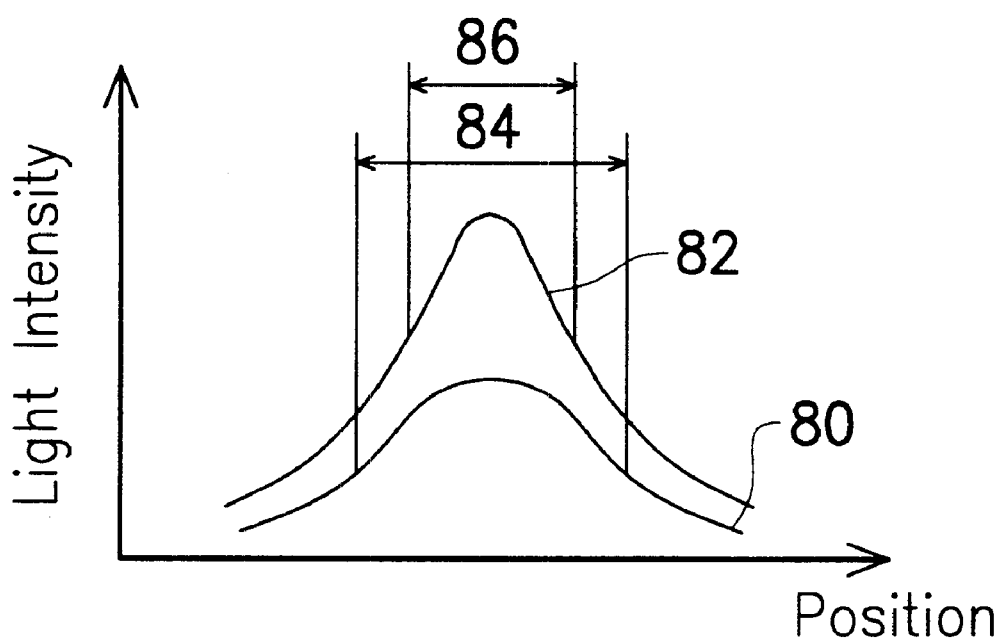
FIG. 5 shows the enhancement from a super-resolution near-field structure.

FIG. 5 shows the light intensity distribution of the light after transmitting through the super-resolution near-field structure 54. In FIG. 5, the horizontal axis indicates the position of the incident light beam 64, and the vertical axis indicates the light intensity of the incident light 64. The intensity of the incident light beam is in a Gaussian distribution. The light incident on the super-resolution near-field structure 54 is shown as the curve 80, while the curve 82 represents the light 66 coming out from the super-resolution near-field structure 54. Apparently, the super-resolution near-field structure 54 greatly increases the light intensity. It is to be noted that the more central of the light beam 66 projecting from the super-resolution near-field structure 54, the stronger the light intensity is. Since the full width of half magnitude (FWHM) 86 of the incident light beam 64 is larger than the full width of half magnitude 88 of the projecting light beam 66, the super-resolution near-field structure 54 has the function of reducing the aperture of the light beam 64. The recording dimension on the recording layer 36 of the compact disc 30 is thus shrunk.

Therefore, using the super-resolution near-field structure, the aperture of the laser light beam 64 for data access is shrunk to break through the diffraction restriction. The dimension of mark size 67 on the compact disc 30 is thus smaller than the dimension of the mark size 65 on the optical plate 50. Without changing the structure of light source, the recording dimension of the compact disc 30 is reduced to increase the recording density and capacity.

Compared to the conventional technique, the invention uses a super-resolution near-field structure to reduce the aperture of a laser light beam for data access. The recording density and capacity can be increased. When the laser light is emitted from a light source, it travels through the super-resolution near-field structure prior to incident on the compact disc. As the super-resolution near-field structure has the function of increasing the light intensity and reducing the aperture of the laser light beam, the diffraction limit can be overcome to form a laser light beam with a further smaller aperture. The recording dimension of the data-recording region is reduced to increase the recording density and capacity.

It will be apparent to those skilled in the art that various modifications and variations can be made to the structure of the present invention without departing from scope or spirit of the invention. In view of the foregoing, it is intended that the present invention cover modifications and variations of this invention provided they fall within the scope of the following claims and their equivalents.

What is claimed is:

1. A method of increasing recording density and capacity of a compact disc, the compact disc comprising a transparent substrate and a data recording region on the transparent substrate, the method comprising:

inserting an optical plate comprising a super-resolution near-field structure between a light source and the compact disc, wherein the super-resolution near-field structure comprises a first and second dielectric layers and an active layer between the first and the second dielectric layers; and projecting a laser light beam emitted from the light source on the optical plate prior to incident on the compact disc for data access; wherein the laser light beam is focused on the data recording region after transmitting the optical plate with a reduced mark size.

2. The method according to claim 1, wherein the active layer is made of at least one material selected from the group consisting of gallium, germanium, arsenic, selenium, indium, tin, antimony, tellurium, and silver.

3. The method according to claim 2, wherein the first dielectric layer is made of at least one material selected from the group consisting of silicon nitride, gallium nitride, aluminum nitride, and titanium nitride.

4. The method according to claim 2, wherein the second dielectric layer is made of at least one material selected from the group consisting of silicon nitride, gallium nitride, aluminum nitride, and titanium nitride.

5. The method according to claim 1, wherein the active layer is made of at least one material selected from the group consisting of gallium oxide, germanium oxide, arsenic oxide, selenium oxide, indium oxide, tin oxide, antimony oxide, tellurium oxide, and silver oxide.

6. The method according to claim 5, wherein the first dielectric layer is made of at least one material selected from the group consisting of zinc sulfide, silicon oxide, aluminum oxide, and titanium oxide.

7. The method according to claim 5, wherein the second dielectric layer is made of at least one material selected from the group consisting of zinc sulfide, silicon oxide, aluminum oxide, and titanium oxide.

8. The method according to claim 1, wherein the super-resolution near-field structure is disposed with a distance to the compact disc smaller than a wavelength of the laser light beam.

9. The method according to claim 1, wherein the laser light beam has a wavelength of about 635 nanometer or about 650 nanometer.

10. The method according to claim 1, wherein the active layer has a thickness of about 15 nanometer, the first dielectric layer has a thickness of about 20 nanometer and the second dielectric layer has a thickness of about 170 nanometer.

* * * * *